(12) United States Patent
Evans et al.

(10) Patent No.: US 8,234,562 B1
(45) Date of Patent: Jul. 31, 2012

(54) ERROR CHECKING FOR DATA ENTRY

(75) Inventors: Rachel L. Evans, San Diego, CA (US);
Leslie A. Skelly, San Diego, CA (US);
Matthew G. Rice, San Diego, CA (US);
John A. Dryden, San Diego, CA (US);
Morris Neer, San Diego, CA (US);
Celia M. Lynn, Locust Grove, VA (US)

(73) Assignee: Intuit Inc., Mountain View, CA (US)

( * ) Notice: Subject to any disclaimer, the term of this patent is extended or adjusted under 35 U.S.C. 154(b) by 1308 days.

(21) Appl. No.: 11/932,366

(22) Filed: Oct. 31, 2007

(51) Int. Cl.
G06F 17/00 (2006.01)
(52) U.S. Cl. ......... 715/224; 715/221; 715/772; 715/714
(58) Field of Classification Search .................. 715/224, 715/221, 226, 708, 772, 714
See application file for complete search history.

(56) References Cited

U.S. PATENT DOCUMENTS

| 7,251,782 | B1 * | 7/2007 | Albers et al. | 715/711 |
| 7,426,496 | B2 * | 9/2008 | Kristjansson | 706/10 |
| 7,921,370 | B1 * | 4/2011 | Legault | 715/762 |
| 2005/0028084 | A1 * | 2/2005 | Dziejma | 715/505 |
| 2007/0113168 | A1 * | 5/2007 | de Souza et al. | 715/507 |
| 2007/0192689 | A1 * | 8/2007 | Johnson et al. | 715/700 |

* cited by examiner

Primary Examiner — Adam M Queler
Assistant Examiner — Howard Cortes
(74) Attorney, Agent, or Firm — Osha Liang LLP

(57) ABSTRACT

A method for displaying a form involves checking an input to determine whether an error exists, where the input corresponds to a field within the form, updating a tally of errors for the form reflecting the error when the error is contained in the field within the form, and visualizing the tally of errors by concurrently displaying the tally of errors and the form, where the field corresponding to the error is identified within the form.

22 Claims, 6 Drawing Sheets

FIG. 5

ERROR CHECKING FOR DATA ENTRY

BACKGROUND OF INVENTION

Consumers constantly deal with complex events such as filing taxes, submitting medical reports, paying real estate fees, and applying for financial aid. Each of these events require submission of data related to the consumer in one or more forms (i.e., any physical or virtual documents or templates that require input, such as text input, selections, or any other suitable method of submitting information).

Generally, forms have multiple sections, pages, and/or fields that require completion by a user. Often consumers make mistakes and/or enter incorrect information into forms. These errors are often hard to identify, and fix. Further, in complex forms, an erroneous entry in a single form may result in multiple mistakes in the same form and/or in various other forms.

One solution is to check the entire form for errors after the user fills out and submits the form. If one or more errors are found, the user is notified of the error and prompted to fix the error in the form.

SUMMARY OF INVENTION

In general, in one aspect, the invention relates to a method for displaying a form. The method comprises checking a first input to determine whether an error exists, where the first input corresponds to a field within the form, updating a tally of errors for the form reflecting the error when the error is contained in the field within the form, and visualizing the tally of errors by concurrently displaying the tally of errors and the form, where the field corresponding to the error is identified within the form.

In general, in one aspect, the invention relates to a system for displaying a form. The system comprising: a data repository, comprising a form comprising at least one field, a plurality of input associated with the form, and a tally of errors associated with an error in the at least one field within the form; an error management engine, comprising functionality to check each of the plurality of input to determine whether an error exists, where the each of the plurality of input corresponds to the at least one field within the form, updating the tally of errors for the form reflecting the error when the error is contained in the field within the form; and a user interface, comprising functionality to visualize the tally of errors by concurrently displaying the tally of errors and the form, where the field corresponding to the error is identified within the form.

In general, in one aspect, the invention relates to a user interface, comprising: a form comprising a field including functionality to accept a user input, an error indicator identifying an error corresponding to the field, and a tally of errors associated with the error in the field and the form, where a concurrent display of the form, the error indicator, and the tally of errors visualizes the tally of errors by identifying the field within the form reflecting the error associated with the tally of errors.

In general, in one aspect, the invention relates to a computer readable medium comprising instructions for displaying a form, where the instructions comprising functionality for: checking a first input to determine whether an error exists, wherein the first input corresponds to a field within the form, updating a tally of errors for the form reflecting the error when the error is contained in the field within the form, and visualizing the tally of errors by concurrently displaying the tally of errors and the form, wherein the field corresponding to the error is identified within the form.

Other aspects and advantages of the invention will be apparent from the following description and the appended claims.

BRIEF DESCRIPTION OF DRAWINGS

FIG. 5 shows an example of a user interface in accordance with one or more embodiments of the invention.

DETAILED DESCRIPTION

Figure 1:
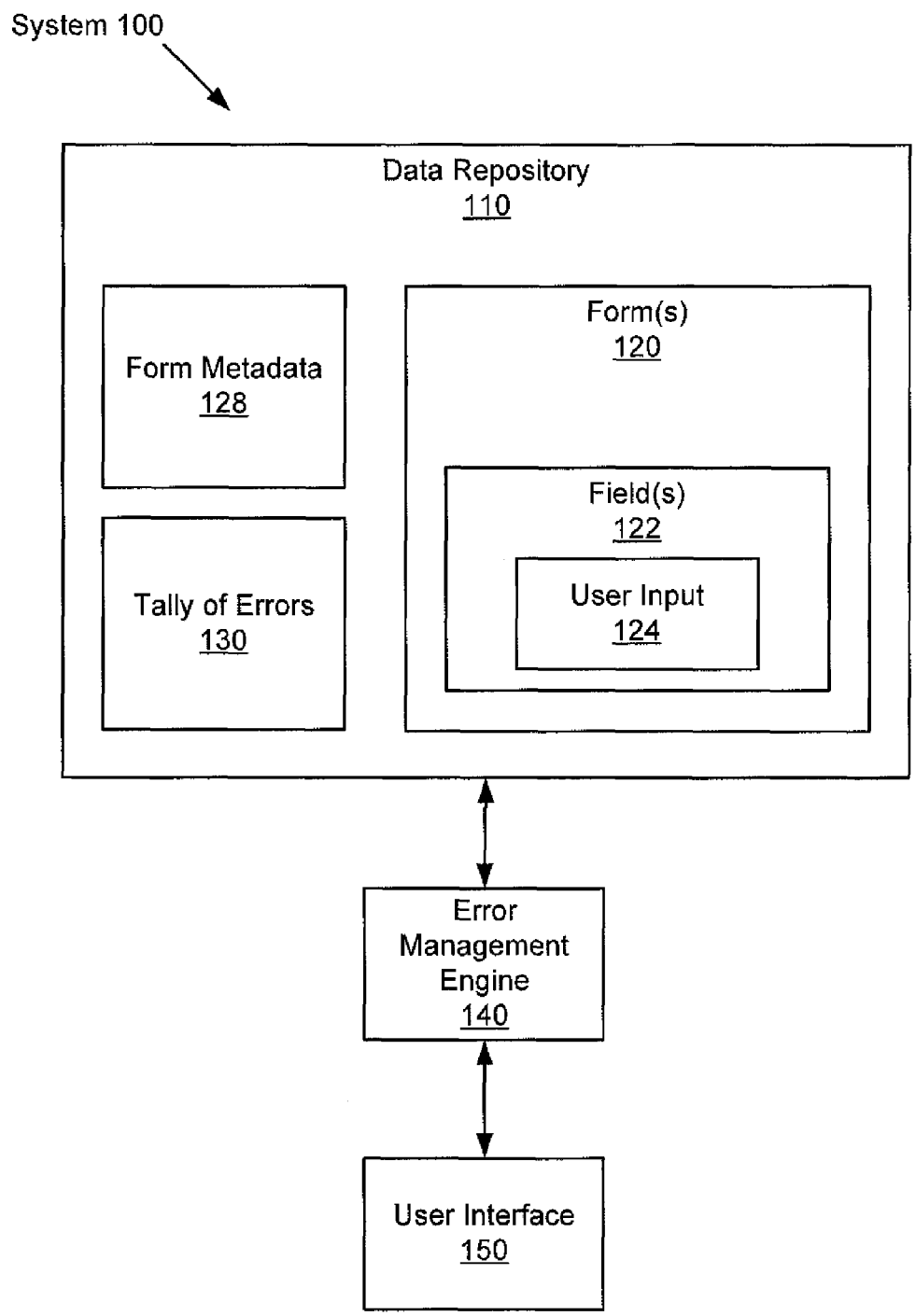
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for managing access to data. Specifically, embodiments of the invention allow for approving authorization for requested data, obtaining outbound data, evaluating authorization associated with the outbound data and providing an alert when the outbound data is not authorized.

FIG. 1 shows a system (100) in accordance with one or more embodiments of the invention. As shown in FIG. 1, the system (100) includes a data repository (110), an error management engine (140), and an interface (150). Each of these components are described below and may be located on the same device (e.g., a server, mainframe, desktop personal computer (PC), laptop, personal desktop assistant (PDA), television, cable box, satellite box, kiosk, telephone, mobile phone, or other computing devices) or may be located on separate devices coupled by a network (e.g., Internet, Intranet, Extranet, Local Area Network (LAN), Wide Area Network (WAN), or other network communication methods), with wire and/or wireless segments.

In one or more embodiments of the invention, the system (100) is implemented using a client-server topology. The system (100) itself may be an enterprise application running on one or more servers, and in some embodiments could be a peer-to-peer system, or resident upon a single computing system. In addition, the system (100) is accessible from other machines using one or more interfaces (e.g. interface (150), web portals (not shown), or any other tool to access the system). In one or more embodiments of the invention, the system (100) is accessible over a network connection (not shown), such as the Internet, by one or more users. Information and/or services provided by the system (100) may also be stored and accessed over the network connection.

In one or more embodiments of the invention, the data repository (110) includes functionality to store information, such as form(s) (120), form metadata (128), and a tally of errors (130). In one or more embodiments of the invention, access to the data repository (110) is restricted and/or secured. As such, access to the data repository (110) may require authentication using passwords, secret questions, personal identification numbers (PINs), biometrics, and/or any other suitable authentication mechanism. Those skilled in the art will appreciate that elements or various portions of data stored in the data repository (110) may be distributed and stored in multiple data repositories. In one or more embodiments of the invention, the data repository (110) is flat, hierarchical, network based, relational, dimensional, object modeled, or structured otherwise. For example, data repository (110) may be maintained as a table of a SQL database or as an indexed text file. In addition, data in the data repository (110) may be verified against data stored in the same or other repositories.

In one or more embodiments of the invention, the form(s) (120) shown as stored in the data repository (110) corresponds to any physical document, virtual document, and/or template that may be used to submit information. The form(s) (120) may correspond to a section of a larger multiform document. Although shown on a single data repository (i.e., data repository (110)), portions of the form(s) (120) may be distributed across multiple data repositories. The form(s) (120) includes fields (122), which correspond to text fields, check boxes, radio buttons, drop down menus, selections, and/or any other component used to submit user input (124). The user input (124) may be stored in the data repository (110) as input within the form, and/or the user input (124) may be stored in the data repository (110) in other formats (e.g., tables, databases, text files, etc.).

The form(s) (120) may also be associated with form metadata (128). Form metadata (128) shown as stored in the data repository (110) corresponds to any information about the form(s) (120), in accordance with one or more embodiments of the invention. Form metadata (128) may include (but is not limited to) a list of fields (122) contained within the form (120), version information about the form (130), rules associated with the fields (122) within the form (120) (e.g., field properties, type of field, type of data associated with fields, permissible values of a field), relationships between different fields (122) in the form (120). For example, form metadata may indicate that a particular field requires a numerical input, and/or the numerical input must be greater than a predetermined numerical value. Another example of form metadata may include a list of all possible cities that may be entered for a city field in a form. In yet another example, if a field in a tax form indicates three dependants of the taxpayer, metadata associated with the tax form may require three different entries for dependant names based on the previous field entry of three dependants. Form metadata (128) may be stored with the form (120) in data repository (110), may be stored in a different local data repository, may be available over a network (e.g., Internet, Intranet, Extranet, Local Area Network (LAN), Wide Area Network (WAN), etc.), and/or may be accessible from any other suitable source.

Continuing with FIG. 1, the tally of errors (130) corresponds to a number of errors in a form (120), a page of form (120), and/or a section of a form (120), in accordance with one or more embodiments of the invention. The tally of errors (130) may be updated as the user inputs (or otherwise enters) data using any means known to those skilled in the art. The tally of errors may also be updated after a user completes input for each field (122) in the form (120). The tally of errors (120) may correspond to an error level. For example, the tally of errors may indicate a "high number of errors," "medium number of errors," or "low number of errors." In one or more embodiments of the invention, the tally of errors (130) may include two separate tallies, a first tally of errors corresponding to a number of data format errors and a second tally corresponding to the a number of data content errors.

Continuing with FIG. 1, in one or more embodiments of the invention, the error management engine (140) corresponds to a process, software application, and/or computer system that includes functionality to evaluate user input (124) for a form (120) in order to check for errors and/or error corrections. The management engine (140) may evaluate the user input based on the form metadata (128) and/or prior user input (124). For example, the management engine (140) may check the user input (124) to ensure that the user input (124) is consistent with any input submitted previously. In another embodiment of the invention, the management engine (140) may include functionality to check the user input (124) against any data external to the form (120). Examples of data external to the form (120) may be information from prior historical entries of the same type (e.g., a tax form from a prior year, an application completed in the past, etc.), information from publicly available directories (e.g., a phone book, a business organization directory, etc.), or other third party source documents. An example of checking the user input (124) may involve the input (124) being verified against any information associated with the user available in one or more data repositories.

In one or more embodiments of the invention, the management engine (140) may also evaluate the user input (124) to determine whether a previously identified error was corrected by the user input (124). For example, if the previous entry for a zip code field included alphabetical characters which were identified as erroneous for the zip code field and the user input is an acceptable replacement for the previous entry, the management engine may determine that the previous error was corrected. In another embodiment of the invention, the error management engine (140) may include functionality to provide a tool tip (described below) associated with an identified error. For example, a tool tip may be a pop up window indicating that alphabetical characters are not accepted in a zip code field. Consider another scenario, where multiple forms are being submitted by a user. In this example, the tool tip may identify a previous form with which the user input for the current form, is inconsistent.

In one or more embodiments of the invention, the error management engine (140) may include functionality to create or modify the tally of errors (130) discussed above. The error management engine (140) may calculate a total number of errors in the form(s) (120) by, for example, determining how many rules associated with the form metadata (128) are violated and/or how many occurrences of inconsistent data are present in the form (120). The error management engine (140) may update the tally of errors (130) by reducing or increasing the tally of errors (130) based on the evaluation of each user input (124). The error management engine (140) may update the tally of errors (130) continuously as the user input (124) is entered or may update the tally of errors (130) after user input (124) for a field (122) is completed.

Continuing with FIG. 1, the interface (150) corresponds to one or more interfaces adapted for use to access the system (100) and any services provided by the system (100). In one or more embodiments of the system, the interface (150) includes functionality to present forms (120), receive user input (124), present the tally of errors (130) associated with a form (120), present tool tips associated with errors, and present identified errors in a form (120).

The user interface (150) may be a web interface, a graphical user interface (GUI), a command line interface, an application interface or any other suitable interface. The user interface (150) may include one or more web pages that can be accessed from a computer with a web browser and/or internet connection. Alternatively, the user interface (150) may be an application that resides on a computing system, such as a PC, mobile devices (e.g., cell phones, pagers, digital music players, mobile media centers), a PDA, and/or other computing devices of the users, and that communicate with the system (100) via one or more network connections and protocols. Regardless of the architecture of the system, communications between the system (100) and the user interface (150) may be secure, as described above. Individual components and functionalities of user interface (150) are shown in FIG. 2 and discussed below.

Figure 2:
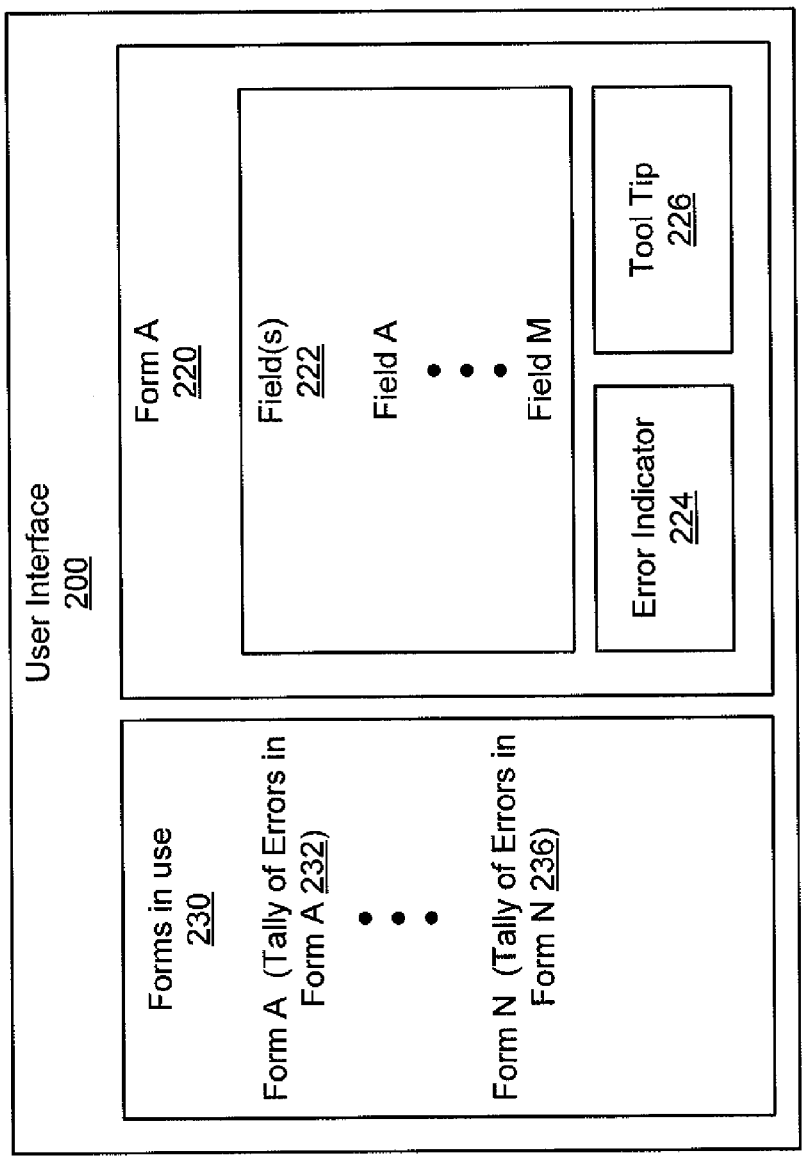
FIG. 2 shows a user interface in accordance with one or more embodiments of the invention.

As shown in FIG. 2, user interface (200) includes forms in use (230), and at least one current form A (220). The forms in use (230) correspond to a list of forms available to the user. The forms in use (230) (e.g., Form A and Form N) may be related to one another, part of the same event (e.g., tax filing forms), or may be unrelated. Each form in use (230) may be associated with a tally of errors (e.g., tally of errors in form A (232) and tally of errors in form N (236)) corresponding to a number of errors in the form. In one or more embodiments of the invention, the tally of errors corresponding to a form is adjacent to the form name. For example, as shown in FIG. 2, the tally of errors in form A (232) is listed adjacent to corresponding name "Form A." A tally of errors (e.g., tally of errors in form A (232)) may be implemented as a link that results in a display and identification of an error in the form (e.g., error indicator (224) discussed below).

Continuing with FIG. 2, the current form A (220) shown in user interface (200) is essentially the same as form (120) discussed above. The current form A (220) includes field(s) (222) (e.g., field A . . . field M) to accept user input. The user interface (200) also includes an error indicator (224) that corresponds to a visualization of the tally of errors in Form A (232) including, but not limited to, underlines, colored fields, and text identifying fields with errors. The error indicators (224) may be enabled or disabled. For example, the error indicator may be enabled when a user selects the tally of errors in Form N (236). This selection by the user results in a display of form N and identifies one or more fields with form N with errors in the associated user input. In one or more embodiments of the invention, the display and identification of an error may also include a tool tip (226). The tool tip (226) corresponds to any message related to the error. The tool tip (226) may indicate why an error was identified, and/or provide a recommendation to fix the error. For example, the tool tip may indicate the type of acceptable input for a particular field or may identify another form that includes data inconsistent with the identified erroneous field.

Figure 3:
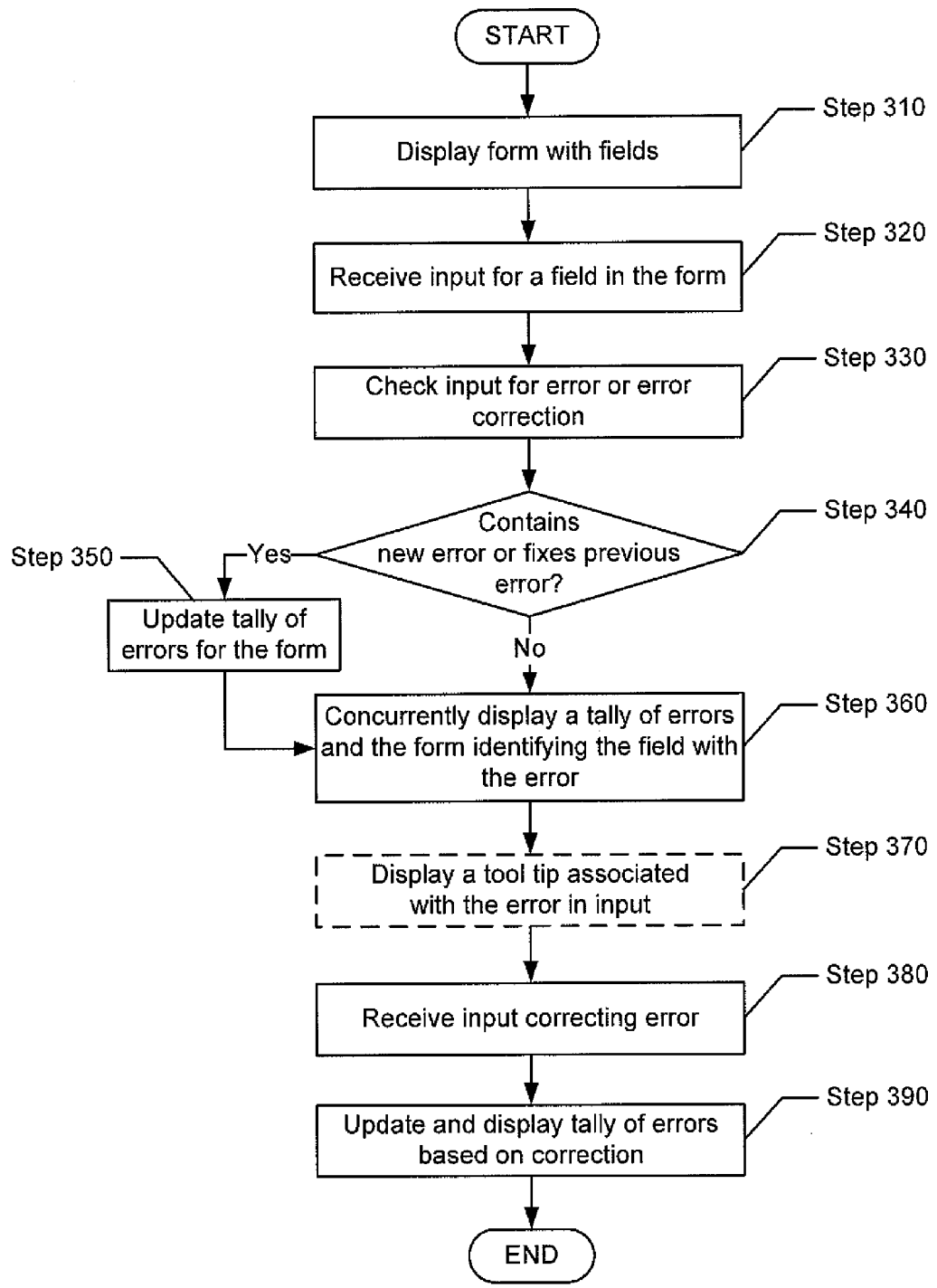
FIGS. 3-4 show flow charts in accordance with one or more embodiments of the invention.
Figure 4:
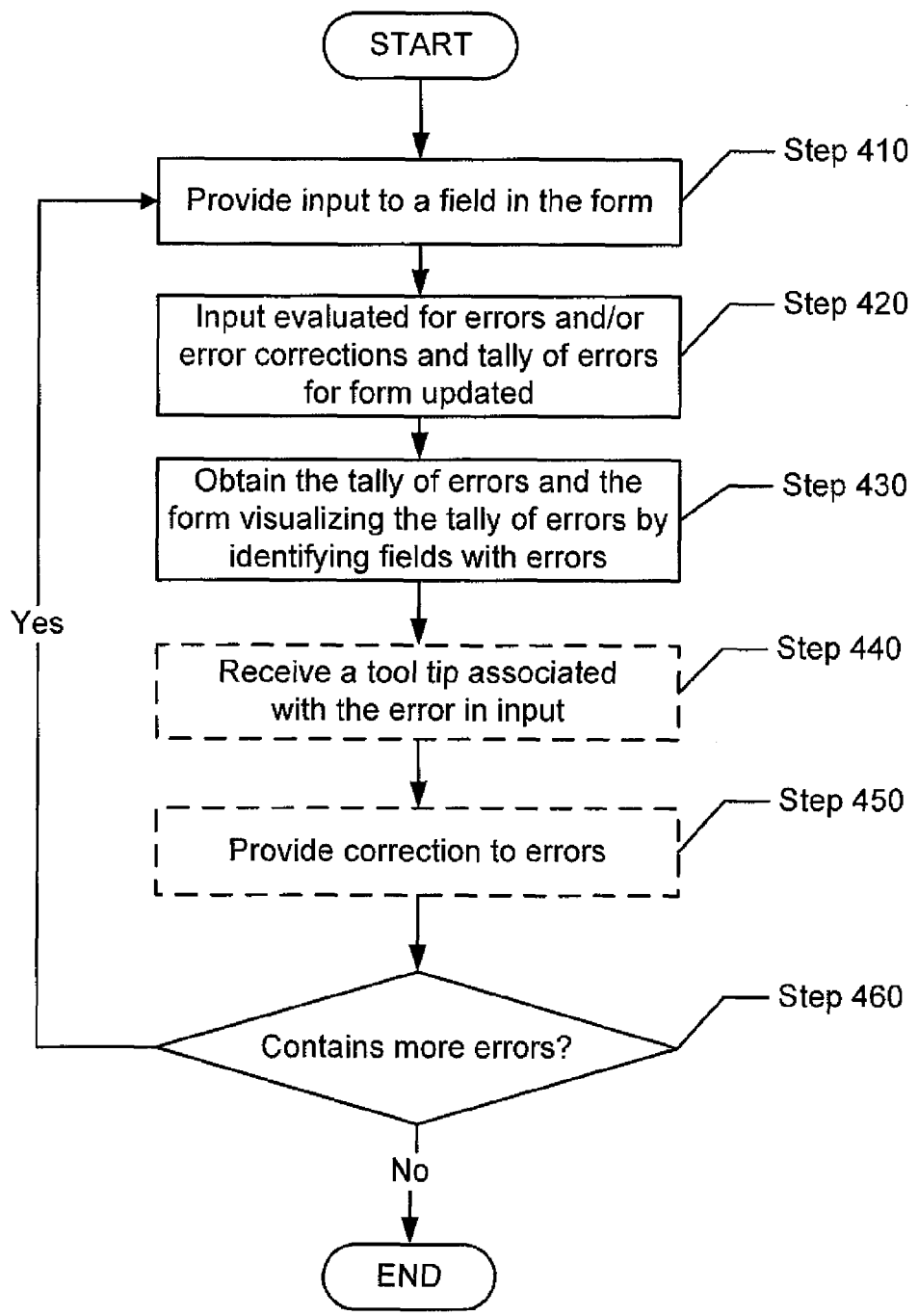

FIGS. 3 and 4 show flow charts for controlling access to data in accordance with one or more embodiments of the invention. In one or more embodiments of the invention, one or more of the steps described below may be omitted, repeated, and/or performed in a different order. Accordingly, the specific arrangement of steps shown in FIGS. 3 and 4 should not be construed as limiting the scope of the invention.

Initially, a form with one or more fields is presented (Step 310). The form may be presented using an interface (e.g., a graphical interface as shown in FIG. 2). The form may also be exported to another application, displayed on a screen, posted on the interne, stored in data repository, printed for a file, sent to a mobile device over a network, or presented in any useful manner.

Next, input corresponding to one or more fields in the form is obtained (Step 320), in accordance with one or more embodiments of the invention. The user input may be received in any manner including (but not limited to) an interface, a website, a file import, web downloads, or in any other suitable manner. In one or more embodiments of the invention, the user input is received from a user, a process, a software application, or other source.

Once obtained, the input is checked (Step 330) to determine whether the input contains errors and/or error corrections (Step 340). The input may be checked for obvious errors such as spelling, and data format (e.g., numerical input for numerical format). The input may also be checked for content errors such as data inconsistency with another field, form, or information available external to the form. The error identified for a form may be a result of input for the form itself or as a result of input to another related form. For example, consider a tax filing event in which the name of a user for a current tax form does not match the name of the user for a previous tax year. In this scenario, the name field may be identified as erroneous. In one or more embodiments of the invention, the input is also checked for corrections to previously identified errors. For example, if erroneous input for a field is replaced with the correct input, the correction of the previous error is identified. In another example, if the input corrects inconsistencies with other data (e.g., previous input or data external to the form), the correction of the error is identified.

An identification of new errors and/or corrections to previous errors results in an update of a tally of errors associated with one or more affected forms (Step 350). The tally of errors may be updated immediately upon identification of an error and/or an error correction. For example, a single input may result in data inconsistencies between multiple forms and result in three instances of inconsistent data. In this case, the tally of errors may be increased for each form with inconsistent data based on the single input for one form.

Next, the tally of errors is displayed concurrently with the associated form identifying one or more errors associated with the tally of errors thereby visualizing the tally of errors, in accordance with one or more embodiments of the invention (Step 360). The tally of errors may be displayed adjacent to the name of the form to inform a user of how many errors have been identified for that form. Concurrently, the form is displayed with the errors, which are included in the tally, identified to allow a user to associate the identified errors with the tally of errors.

The errors may be identified using visualizations such as color, bolding and/or underlines, or using text that lists erroneous input. For example, the tally of errors and the corresponding errors within an associated form may be shown in the same color to demonstrate the relation between the tally of errors and the identified errors within the form. In one or more embodiments of the invention, the tally of errors may be displayed as a link that hyperlinks directly to a field corresponding to an error associated with the tally of errors. One skilled in the art will appreciate that the tally of errors associated with a form may be displayed directly on the form, for example, as a counter at the top of the page. The counter in this example is updated with each input if an error is entered or a previous error is corrected. One or more embodiments of the invention, allow a user to view the tally of errors in context of the form by concurrently displaying the tally of errors and the errors identified in a display of a form. In one embodiment of the invention, a tally of errors for each form in use may be displayed as shown in FIG. 2. For example, consider a scenario where a user is working on four related forms with data inconsistent in all four forms as a result of a single erroneous input. In this case, a correction to the input results in an immediate update for the tally of errors for each of the four forms. Further, the user is able to immediately view the effect of the single input for multiple forms as the tally of errors for each form is updated at once.

In addition to the tally of errors and the identification of the errors, tool tips associated with the errors may also be displayed, in accordance with one or more embodiments of the invention (Step 370). The tool tip may be activated by a user selection (e.g., selecting or scrolling over an identified error), activated automatically by erroneous input, or implemented based on another suitable scheme.

Lastly, in response to the display of the tally of errors, the visualization of the tally of errors by indicating the errors with the form, and/or the tool tips, a user may enter a correction to one or more errors (Step 380) resulting in updates to a tally of error (Step 390). Steps 380 and 390 are essentially the same as steps 320-360, as described above.

As discussed above, FIG. 4 shows a flowchart for controlling access to data in accordance with one or more embodiments of the invention. Initially, input is provided for a field in a form by a user (Step 410). The input may be provided by a selection, a textual input, a graphical input, a file upload, a file read or by any other means. The provided input is then checked for errors or error corrections and a tally of errors associated with the form is updated accordingly (Step 420). Step 420 is essentially the same as Steps 330-350 shown in FIG. 3, and described above.

Next, a tally of errors and a form visualizing the tally of errors by identifying the errors associated with the tally of errors is obtained, in accordance with one or more embodiments of the invention (Step 430). The tally of errors may be displayed adjacent to a form name to identify the number of errors in the form due to data format errors, and/or data content errors. In one embodiment of the invention, the tally of errors may be activated by scrolling over a form name. In another embodiment of the invention, the tally of errors may immediately be displayed if at least one error for a form has been identified. The tally of errors and the form visualizing the tally of errors may be obtained based on the display described in Step 360 above.

In one or more embodiments of the invention, a tool tip associated with an error is obtained in accordance with one or more embodiments of the invention (Step 440). The tool tip may be obtained based on the display of the tool tip described in Step 370 above. The tool tip may assist a user in providing an input including a correction to an error associated with a field within the form.

Next, in response to errors identified in a form, corrections may be submitted by the user (Step 450). Corrections may be submitted in the same manner as the original input. In one or more embodiments of the invention, selecting the tally of errors for a form results in a consecutive display of errors to be fixed. For example, selecting a tally of errors results in a display and identification of a first error, where a user submits a new input in response to the first error. Thereafter, the new input is checked for errors and error corrections (Step 420) and an updated tally of errors is received (Step 430). Once the error is found to be corrected, the next error in the form is displayed. The process may be repeated until no more errors are remaining (Step 460) (or at least the errors that the user intends to correct are eliminated).

Figure 5:
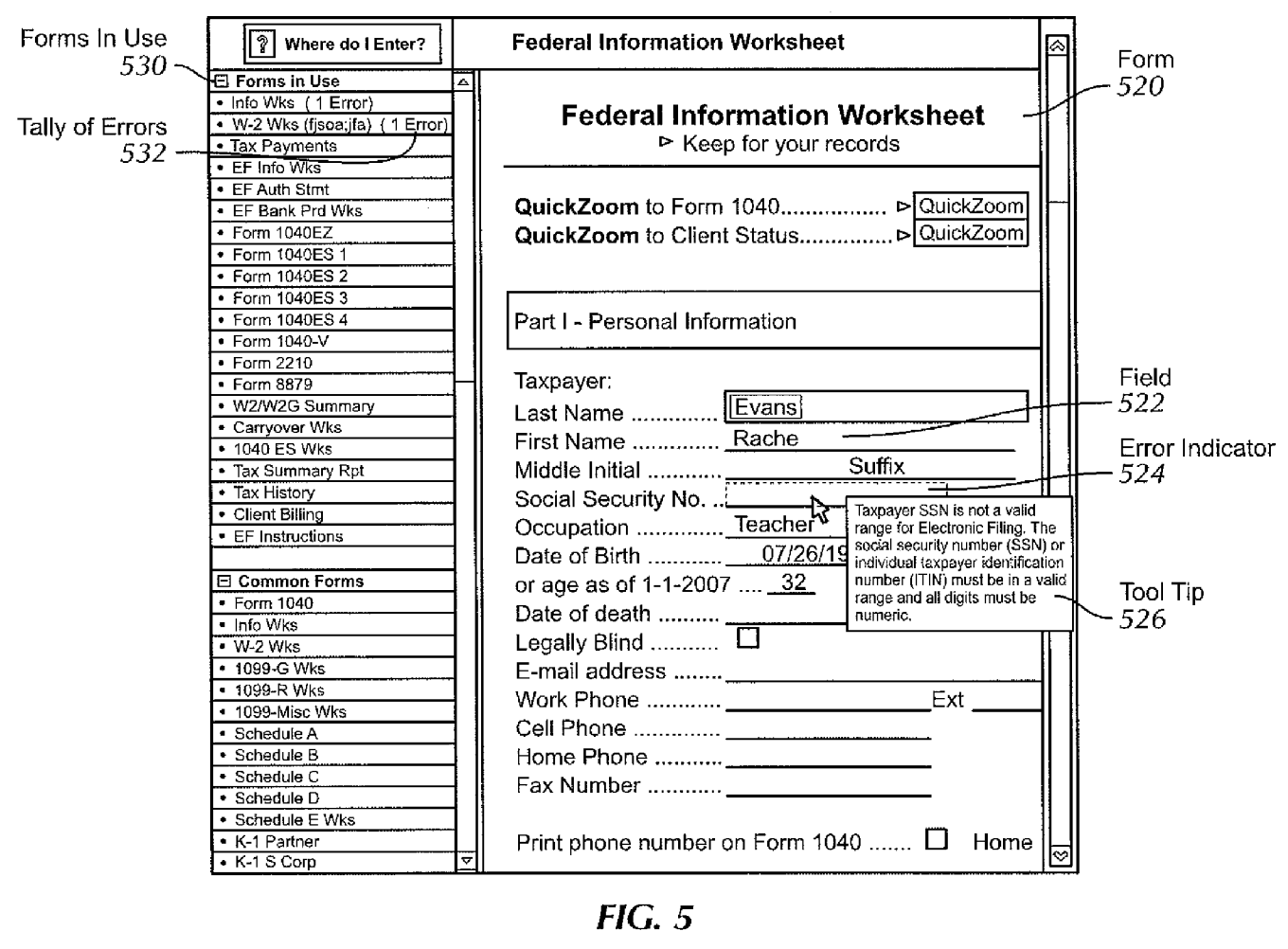

FIG. 5 shows an example of an interface (500) in accordance with one or more embodiments of the invention that is not intended to limit the invention. In this example, a user is entering input for an information worksheet form (520) associated with taxes. The form (520) contains multiple fields into which a user may enter input (e.g., field (540)).

In this example, the user has skipped a required social security field, identified by the error indicator (524) and concurrently referred to by the tally of errors (532). The concurrent display of the form (520) with the error indicator (524) and the tally of errors (532) allow the user to visualize the tally of errors (532) and easily identify the field resulting in the error. The tool tip (526) informs the user what the error is. Furthermore, the user is also able to view a tally of errors for all forms in use (530). This information allows a user to quickly estimate how much work is needed to fix the errors in the forms.

At this point the user may correct the error by submitting a valid social security number or may continue the worksheet if, for example, the social security number is not readily available. At any later point, when the user is working on the same information worksheet form (520) or another form in use (530), the user may select the tally of errors (532) associated with the information worksheet form (520) and return to the erroneous field identified by the error indicator (524). Upon submitting the correct input to the field, the user is provided an updated tally of errors. In this example, since there is only one error, the user's correct input may result in zero errors for the form (520).

Figure 6:
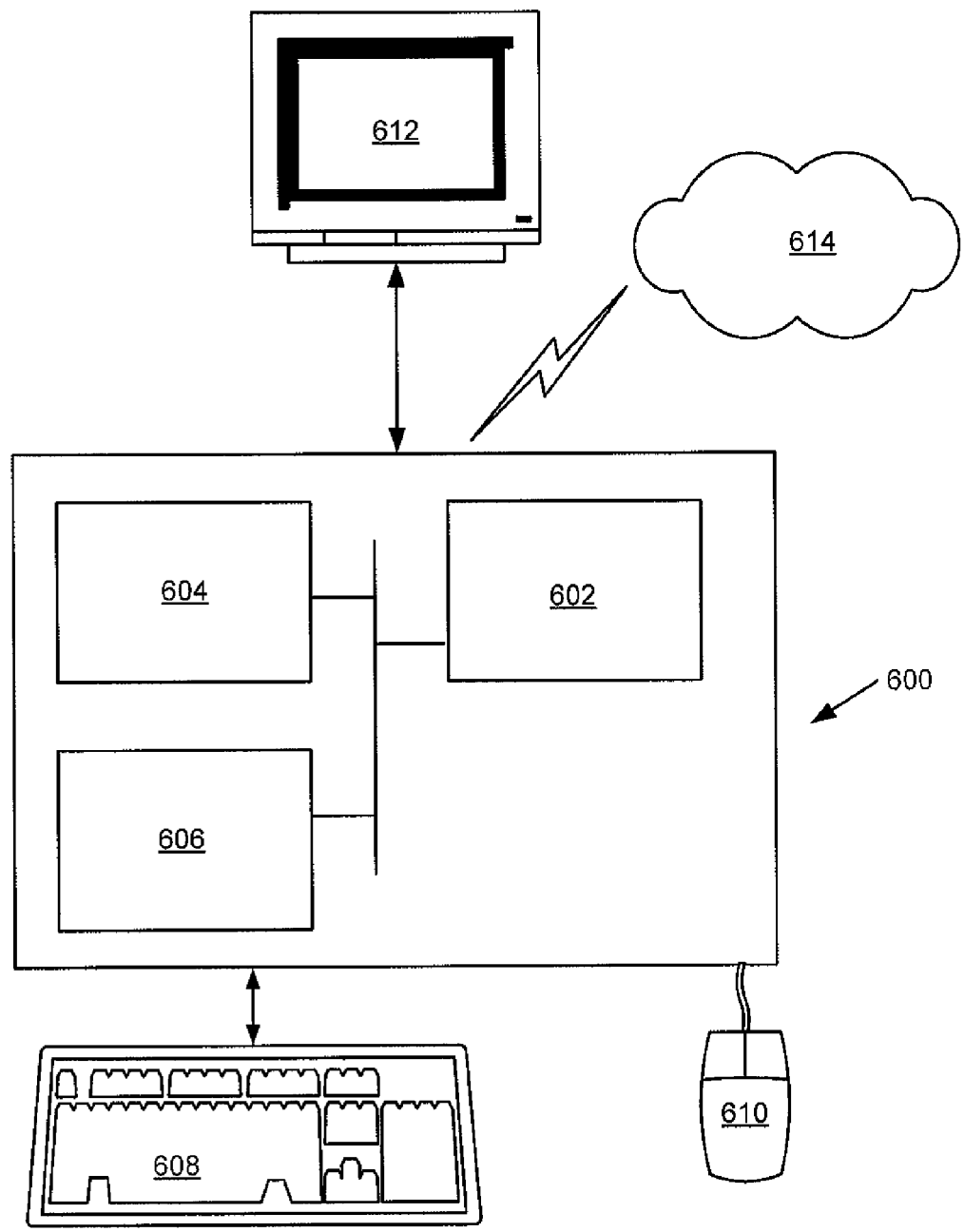
FIG. 6 shows a computer system in accordance with one or more embodiments of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a LAN or a WAN (e.g., the Internet) (614) via a network interface connection. Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., object store layer, communication layer, simulation logic layer, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for displaying a plurality of forms, comprising:
   displaying a first form and a first form name of the first form;
   making a first determination that a first error exists by checking a first input corresponding to a first field within the first form;

in response to the first determination:
  updating a first form error tally for the first form reflecting the first error based on the first error being contained in the first field; and
  concurrently displaying:
    the first form error tally;
    the first form;
    a form name list of forms in use, wherein the form name list comprises a second form name, wherein the second form name identifies a second form that is not currently displayed; and
    a second form error tally for the second form, wherein the second form error tally reflects a second error in a second field of the second form;
detecting a correction of the first error in the first field of the first form;
updating the first form error tally to obtain an updated first form error tally, wherein the updated first form error tally reflects the correction of the first error;
making a second determination that the correction of the first error automatically corrects the second error in the second field of the second form;
updating, in response to the second determination, the second form error tally for the second form to obtain an updated second form error tally, wherein the updated second form error tally reflects the correction of the second error; and
concurrently displaying the first form, the form name list of forms in use, the updated first form error tally, and the updated second form error tally.

2. The method of claim 1, wherein the first form error tally corresponds to a number of fields within the first form comprising at least one error.

3. The method of claim 1, further comprising:
continuously updating the first form error tally subsequent to obtaining each input associated with the first form while concurrently displaying the first form error tally and the first form.

4. The method of claim 1, wherein the first form error tally is displayed adjacent to the first form name.

5. The method of claim 1, wherein concurrently displaying the first form error tally and the first form identifies each error in the first form to visualize the first form error tally.

6. The method of claim 1, wherein the first form is a financial form.

7. The method of claim 1, further comprising:
concurrently displaying a tool tip associated with the first error.

8. A system for displaying a form, comprising:
a processor
a data repository, comprising:
  a first form comprising a first field;
  a first form name of the first form;
  a first input of a plurality of inputs associated with the first form;
  a first form error tally associated with a first error in the first field within the first form;
  a second form comprising a second field;
  a second form name of the second form; and
  a second form error tally associated with a second error in the second filed within the second form;
an error management engine executing on the processor, comprising functionality to:
  make a first determination that the first error exists by checking the-first input corresponding to the first field within the first form;
  update, in response to the first determination, the first form error tally for the first form reflecting the first error based on the first error being contained in the first field within the first form;
  detect a correction of the first error in the first field of the first form;
  update the first form error tally to obtain an updated first form error tally, wherein the updated first form error tally reflects the correction of the first error;
  make a second determination that the correction of the first error automatically corrects the second error in the second field of the second form; and
  update, in response to the second determination, the second form error tally for the second form to obtain an updated second form error tally, wherein the updated second form error tally reflects the correction of the second error; and
a user interface, comprising functionality to:
  concurrently display:
    the first form error tally, the first form, the second form error tally, and a form name list of forms in use, wherein the form name list comprises the second form name, and wherein the second form is not currently displayed; and
  concurrently display: the first form, the form name list of forms in use, the updated first form error tally, and the updated second form error tally.

9. The system of claim 8, wherein the first form error tally corresponds to a number of fields in the first form comprising at least one error.

10. The system of claim 8, wherein the error management engine further comprises functionality to update the first form error tally subsequent to obtaining each of the plurality of inputs associated with the first form while the first form error tally and the first form are concurrently displayed by the user interface.

11. The system of claim 8, wherein the user interface further comprises functionality to concurrently display the first form name associated with the first form adjacent to the first form error tally for the first form.

12. The system of claim 8, wherein concurrently displaying the first form error tally and the first form identifies each error in the first form to visualize the first form error tally.

13. The system of claim 8, wherein the first form is a financial form.

14. The system of claim 8, wherein the user interface further comprises functionality to concurrently display a tool tip associated with the first error.

15. The system of claim 8, wherein the data repository further comprises form metadata, wherein each of the plurality of inputs corresponding to the first field is checked based on the form metadata.

16. A non-transitory computer readable medium comprising instructions to display a user interface, wherein the instructions comprise functionality for:
displaying a first form comprising:
  a first field including functionality to accept a user input; and
  an error indicator identifying a first error corresponding to the first field; and
displaying a form name list of forms in use comprising:
  a first form name identifying the first form
  a first form error tally reflecting the first error in the first field of the first form
  a second form name identifying a second form, wherein the second form is not currently displayed; and a second form error tally for the second form, wherein the second form error tally reflects a second error in a second field of the second form; and displaying an updated form name list of forms in use comprising:
  an updated first form error tally for the first form reflecting a correction of the first error in the first field of the first form; and
  an updated second form error tally for the second form reflecting a correction of the second error in the second field of the second form, wherein the correction of the first error automatically corrects the second error.

17. The non-transitory computer readable medium of claim 16, wherein the first form error tally corresponds to a number of fields within the first form comprising at least one error and comprises a link to the first error within the first field.

18. The non-transitory computer readable medium of claim 16, wherein first form error tally is continuously updated subsequent to obtaining each input associated with the first form.

19. The non-transitory computer readable medium of claim 16, wherein the first form error tally associated with the first form is displayed adjacent to the first form name.

20. The non-transitory computer readable medium of claim 16, wherein the instructions further comprise displaying a tool tip associated with the first error corresponding to the first field within the first form.

21. The non-transitory computer readable medium of claim 16, wherein the first form is a financial form.

22. A non-transitory computer readable medium comprising instructions for displaying a form, wherein the instructions comprise functionality for:

displaying a first form and a first form name of the first form;

making a first determination that a first error exists by checking a first input corresponding to a first field within the first form;

in response to the first determination:
  updating a first form error tally for the first form reflecting the first error based on the first error being contained in the first field; and
  concurrently displaying:
    the first form error tally;
    the first form;
    a form name list of forms in use, wherein the form name list comprises a second form name, wherein the second form name identifies a second form that is not currently displayed; and
    a second form error tally for the second form, wherein the second form error tally reflects a second error in a second field of the second form;

detecting a correction of the first error in the first field of the first form;

updating the first form error tally to obtain an updated first form error tally, wherein the updated first form error tally reflects the correction of the first error;

making a second determination that the correction of the first error automatically corrects the second error in the second field of the second form;

updating, in response to the second determination, the second form error tally for the second form to obtain an updated second form error tally, wherein the updated second form error tally reflects the correction of the second error; and concurrently displaying the first form, the form name list of forms in use, the updated first form error tally, and the updated second form error tally.

* * * * *